April 6, 1926. 1,579,641
R. S. BURDETTE
METHOD AND APPARATUS FOR RETREADING TIRES
Filed June 10, 1921 5 Sheets-Sheet 1

Inventor
Richard S. Burdette

April 6, 1926.                                          1,579,641
R. S. BURDETTE
METHOD AND APPARATUS FOR RETREADING TIRES
Filed June 10, 1921          5 Sheets-Sheet 3

Inventor
Richard S. Burdette

Witness:
Philip E. Barnes

By R. S. Trogner
Attorney

April 6, 1926. 1,579,641
R. S. BURDETTE
METHOD AND APPARATUS FOR RETREADING TIRES
Filed June 10, 1921 5 Sheets-Sheet 4

Inventor
Richard S. Burdette

Witness:
Philip E. Barnes

By P. D. Trogner
Attorney

Patented Apr. 6, 1926.

1,579,641

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

METHOD AND APPARATUS FOR RETREADING TIRES.

Application filed June 10, 1921. Serial No. 476,637.

*To all whom it may concern:*

Be it known that I, RICHARD S. BURDETTE, a citizen of the United States, and resident of Akron, Ohio, have invented new and useful Improvements in Methods and Apparatus for Retreading Tires, of which the following is a specification.

My invention relates, broadly, to improvements in apparatus for and methods of applying outer covering portions of tire casings, and more specifically to an apparatus and a method for use in performing what is known as the retreading operation, i. e., replacing the tread elements or a portion thereof upon pneumatic tire casings.

In performing the retreading operation by the usual practice, after the casing has been stripped to the carcass, new tread elements, such as a cushion strip, breaker strip, under tread, and tread band, are arranged in order upon the carcass and are subsequently united therewith by the process of vulcanization. Additional elements may be included in this tread assembly, but the element to be applied directly to the carcass is always the cushion strip which is composed of rubber or rubber composition. The elements are then bound to the casing by a cloth wrapping, or frequently, the casing is enclosed in a mold, and the casing and elements are expanded or stretched against the wrapper, or the mold, in order that they may be held in a compressed condition during vulcanization. Usually an air bag, or like device, is disposed within the casing, and fluid under pressure is introduced therein to procure the expansive action. The casing is then vulcanized in an open heater with steam pressure.

The above described procedure has, in practice, been found to produce satisfactory results, given favorable conditions, but it is unreliable in its action for the following reasons. The carcass portion of a tire casing being essentially a fabric structure is, therefore, porous. Air frequently becomes entrapped between the carcass and the air bag, and is subsequently forced, by the expansion of the bag and the pressure in the heater through the carcass portion. directly against the rubber cushion strip. The cushion strip being impervious to fluid, the result is substantially the formation of an air pocket between the strip and the carcass portion, which entrapped air, in conjunction with the action of the pressure within the heater, prevents the air bag from properly compressing the casing and tread against the wrapping during vulcanization. As will be readily understood, in vulcanizing rubber and fabric together, positive and uniform compression of the materials is essential in order that a proper union may be procured. Therefore, in the above described contingency only a partial union occurs between the cushion strip and the carcass during vulcanization. Substantially the same undesirable results, obtaining in the practice of the commonly used method, above described, occur when moisture accumulates in the various plies of the carcass.

It is the primary object of my invention to provide a method of and apparatus for use in retreading tires whereby the previously mentioned disadvantages are obviated, or in other words, a uniform compression between the carcass, and all of the various elements of the tread may be positively effected.

The invention is further directed to procuring this advantageous objective by the use of a minimum degree of fluid pressure within the casing, a result impossible of attainment in the practice of the previously described method inasmuch as the greater force of internal pressure is expended in stretching the carcass and its associated elements up to the wrapper or mold, and also in stretching the wrapper.

Other objects and advantages, such as eliminating stretching of the casing and the air bag above referred to, will become apparent when the following detailed description is read in conjunction with the drawings accompanying and forming a part of this specification.

Figure 1:
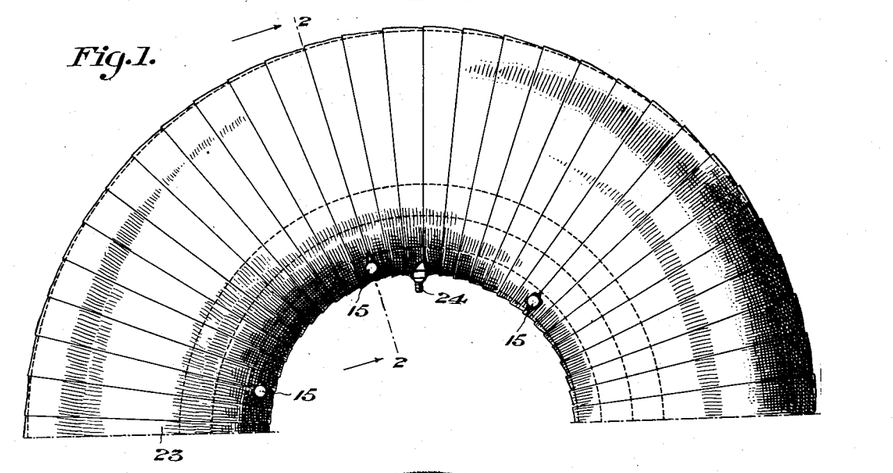
Fig. 1 is a side elevational view showing one-half of a preferred type of apparatus used in practicing my method.
Figure 2:
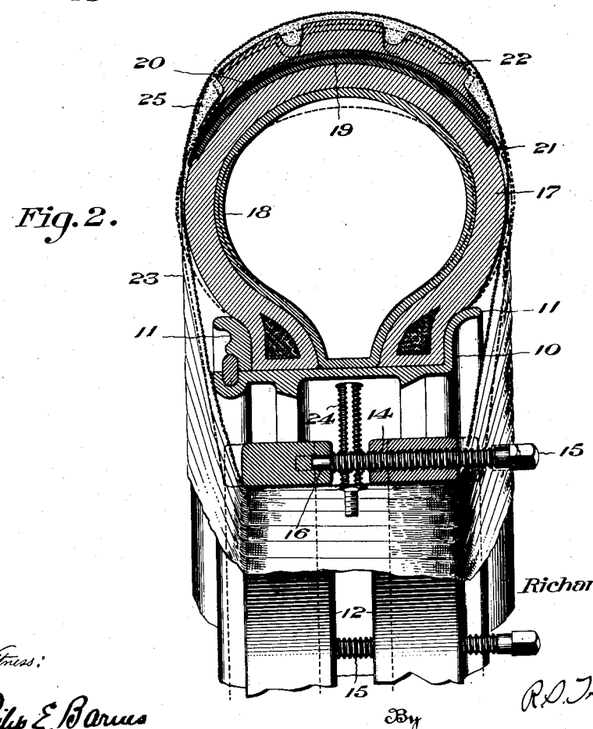
Fig. 2 is a transverse sectional view on an enlarged scale taken on the line 2—2 of Fig. 1 and illustrating, in full and dotted lines, different steps of the method.

Referring to the drawings, and particularly to Figs. 1 and 2, wherein a preferred embodiment of the invention is disclosed, the numeral 10 designates an ordinary type of rim provided with the usual tire retaining flanges 11. In conjunction with this rim I utilize a pair of annular members 12, which may be of any suitable construction either sectional or otherwise. Normally the members 12 are positioned, as shown in the full lines of the drawing, with their respective inner faces arranged in juxtaposed relation. One of the members 12, or both if desired, is provided with a plurality of threaded openings 14 which are adapted to receive set screws 15, or other suitable devices, by means of which the members 12 are forced apart in a relatively lateral direction. Preferably one of the members is socketed, as at 16, to receive the end of the set screw 15, in order that the members may be held in alignment.

Upon the rim 10 I mount, in the usual manner, the tire carcass 17, with an air bag or tube 18 enclosed therein. In this instance an ordinary inner tube has been shown, as illustrative of the practice of the invention.

The elements comprising the tread, such as the cushion strip 19, breaker strip 20, the under tread 21 and the tread band 22, are next arranged in order upon the carcass and are bound thereon by a wrapping strip 23. As shown, the wrapping strip is arranged in a helical winding around the entire structure in such manner as to enclose the annular members 12. So far, the various elements of the casing, and the apparatus are in substantially the position shown in full lines in Figs. 1 and 2 of the drawing with the casing in its normal position, and with the wrapping preferably drawn taut enough to remove the slack therefrom.

The elements 15 are now adjusted to force the members 12 laterally from each other, as shown by the dotted lines in Fig. 2. This action creates a tension upon the wrapper 23 by widening the bight of each loop of the wrapping, thus exerting a pull upon each loop in a direction inwardly and radially of the rim. The force of the tension being greatest in the direction of the pull of each loop, it will be seen that the maximum effect of the tension is directed against the tread area of the casing, the sides being free, to a certain degree, to buckle or flex outwardly. Thus the crown of the casing is drawn inwardly toward the rim, and the tire and tube are compressed and flexed into substantially the position indicated in dotted lines in Fig. 2, i. e., into an elliptical cross-sectional contour.

By means of the separable members 12 I obtain a uniform and positive tension throughout the several loops of the wrapping 23, each loop being free under the pull exerted thereon to adjust itself about the casing and the annular members, during the separation of the latter. The tension is thereby increased equally throughout each successive loop after the wrapping operation, a result that is difficult to attain by any other means of which I am aware.

Fluid under pressure is now introduced by any suitable means through a valve stem 24, and the casing is flexed against the tensioned wrapper 23 to substantially its original position.

The casing may now be vulcanized, preferably in a kettle, although other means may be employed.

By thus effecting a positive tension upon the wrapper 23, the major portion of the stretch inherent therein is removed as the tire is compressed and the air that may be entrapped between the tube 18 and the carcass 17 will be forced from the tread zone down around the side walls and bead portions of the carcass. Hence, the tube, during its subsequent outward flexing action, meets with substantially instantaneous resistance and the full force of the fluid, under compression therein, is utilized in performing a compressing action, principally at the tread zone, instead of in stretching the carcass, the tread elements and the wrapper. The foregoing steps may be varied, if desired, and pressure may be initially introduced within the tube 18 before the wrapper is tensioned, after which such pressure may be increased to the proper degree.

If desired, a paste of soapstone or equivalent means may be utilized for filling in the depressions in the tread bands, as shown at 25 in Fig. 2, in order that the pressure may be equally distributed throughout the entire width of the tread. In the case of side wall repairs, and repairs made adjacent the bead portions of the casing, pads 26 of any suitable structure or material may be used for the same purpose as designated for the soapstone, as shown in Fig. 3, or such pads may be used adjacent the tread band edges, or on the tread band itself, if desired.

Figures 4, 5, 6:
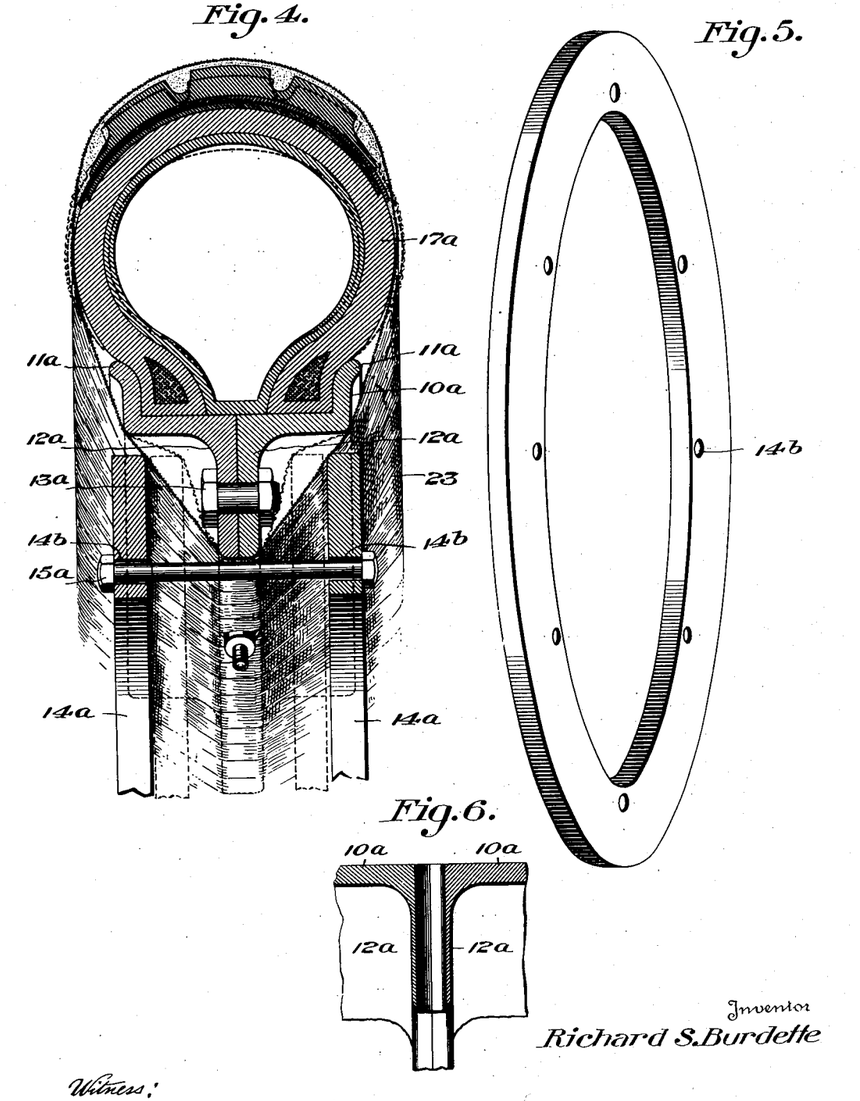
Fig. 4 is a transverse sectional view illustrating a modified type of apparatus.
Fig. 5 is a detail perspective view of one of the elements embodied in the type of apparatus illustrated in Fig. 4.
Fig. 6 is a transverse sectional view of a portion of the supporting element illustrated in Fig. 4.

The previously described apparatus may be modified in various ways some of which modifications have been illustrated in the succeeding figures of the drawing. For instance, in Fig. 4 a different type of rim for supporting the casing is provided, and the wrapper tensioning members are constructed to move in a reverse direction from that previously described. The rim in this instance is formed of two annular sections 10$^a$ provided respectively with a bead engaging flange 11$^a$ and an inwardly extending flange 12$^a$, by means of which the sections are bolted together, as indicated at 13$^a$. The wrapper 23 is arranged about the casing 17$^a$ and the rim in approximately the manner illustrated in full lines in Fig. 4, but the tensioning members 14$^a$ are arranged exteriorly of the wrapper instead of interiorly thereof, as in the former type of apparatus. These members 14$^a$ are also actuated by means of nut and bolt devices 15$^a$, but are designed to move toward each other, as shown by the dotted lines in Fig. 4, instead of being separated as are the members 12. The members 14$^a$ are also of annular form, as shown in Fig. 5, and are provided with a plurality of openings 14$^b$ designed to receive the bolts 15$^a$, previously described.

This type of apparatus is also well adapted for procuring a uniform tension upon the wrapping, and is particularly effective in compressing the bead portions of the carcass laterally against the lower portion of the tube 18, thereby securing a proper positioning of these portions prior to the wrapping operation.

Figures 3, 7, 8, 9:
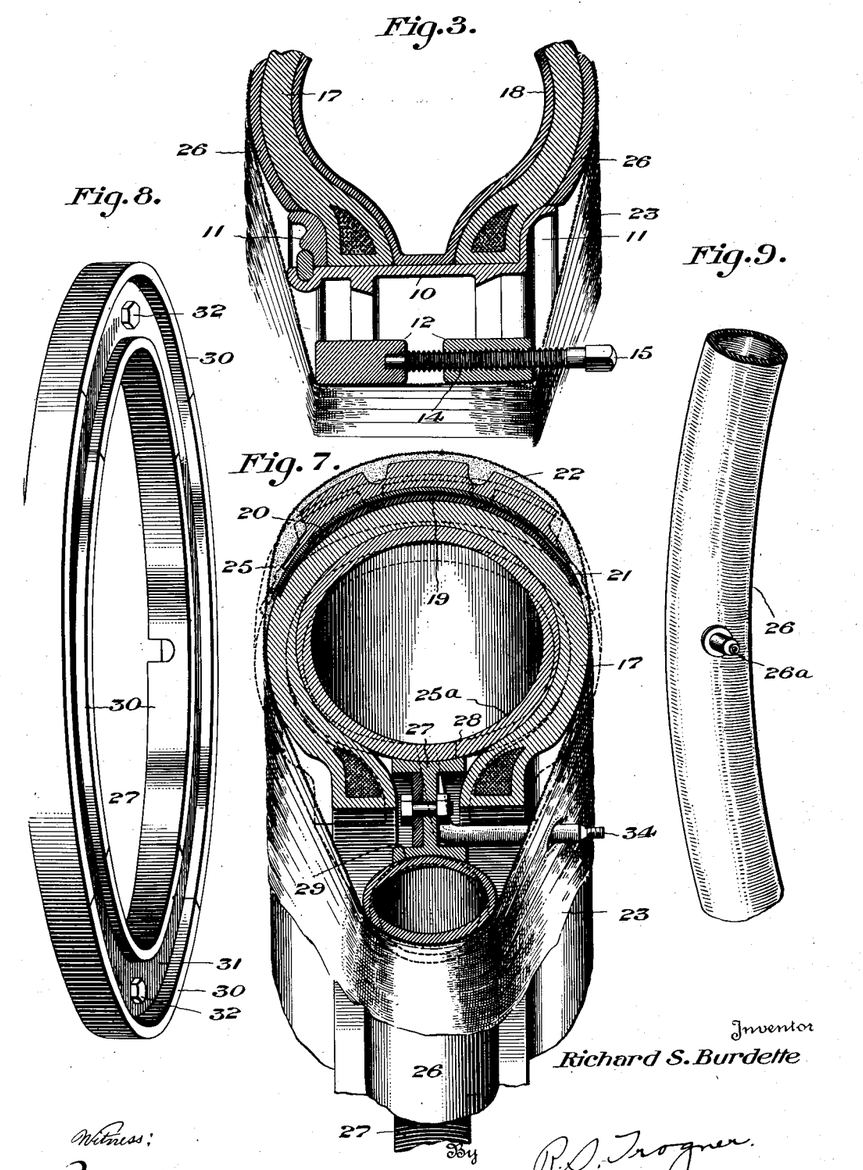
Fig. 3 is a transverse fragmentary view illustrating another feature of the invention.
Fig. 7 is a transverse sectional view illustrating in dotted and full lines another modification of the invention.
Fig. 8 is a perspective view illustrating an element of the type of apparatus illustrated in Fig. 7.
Fig. 9 is a perspective view illustrating a portion of another element used in the type of apparatus illustrated in Fig. 7.

In Fig. 7, I have illustrated another type of apparatus. In this form of the invention, instead of utilizing the previously described type of rims I provide an annulus 27 having outer and inner concave peripheral surfaces 28 and 29, which serve to seat respectively an air bag 25$^a$ and an air tube 26. This annulus preferably comprises sections 30 held together by a locking ring 31 and bolts 32. If desired the sections may be constructed to provide an annulus having relatively flat outer and inner peripheries, as shown in Fig. 5, instead of the concave peripheral surfaces previously described. The wrapper 23 is positively tensioned as in the previously described forms, but it will be noted that I employ an air bag 25$^a$, of substantially elliptical form in cross-section, and that the bead portions of the casing are free instead of being confined, as with the previous type of apparatus. By leaving the bead portions of the casing free, the crown portion thereof and the tread elements are more readily depressed, particularly in tires of larger and heavier types, when the wrapper is tensioned, inasmuch as the entire side walls of the casing are free to flex outwardly. By virtue of this arrangement and with the elliptical form of air bag casings of various sizes may be retreaded inasmuch as only the crown portion of the casing is supported. The type of air bag may be partially inflated previous to mounting the casing thereon, but it is preferably constructed with walls of sufficient rigidity to prevent its collapse under the combined weight of the casing and the effects of initially tensioning the wrapper. After the casing and the tread elements have been mounted upon the annulus 27 and the wrapping arranged, fluid under pressure is admitted into the tube 26 through the valve 26$^a$ and substantially the same action occurs as previously described, the crown of the casing and the air bag being compressed from substantially the full line or normal position to the dotted line position shown in Fig. 7. This action removes the entrapped air from between the tread zone of the carcass, and the air bag, and also stretches and tensions the wrapping 23. Fluid is now admitted into the air bag 25$^a$ through the valve 34, and the casing and tread elements are forced back into substantially their normal position against the tensioned wrapper 23. The tendency of an air bag of this character, under the effects of the internal pressure, is to assume a circular cross-sectional contour by flexing outwardly in the direction of its shorter axis. Because of this characteristic it is peculiarly adapted for localizing the force of the internal pressure against the tread zone of the carcass, as will be apparent. Thus, with this type of apparatus, as in those previously described, the entire action of the air bag, as well as of the casing, is a flexing instead of a stretching action. This is a distinctly advantageous feature since, after a few cures, air bags that have been subjected to continuous stretching operations become practically useless in the retreading operation. Moreover, an air bag of this contour may be made of much cheaper material inasmuch as it is not designed to stretch during inflation.

Figure 10:
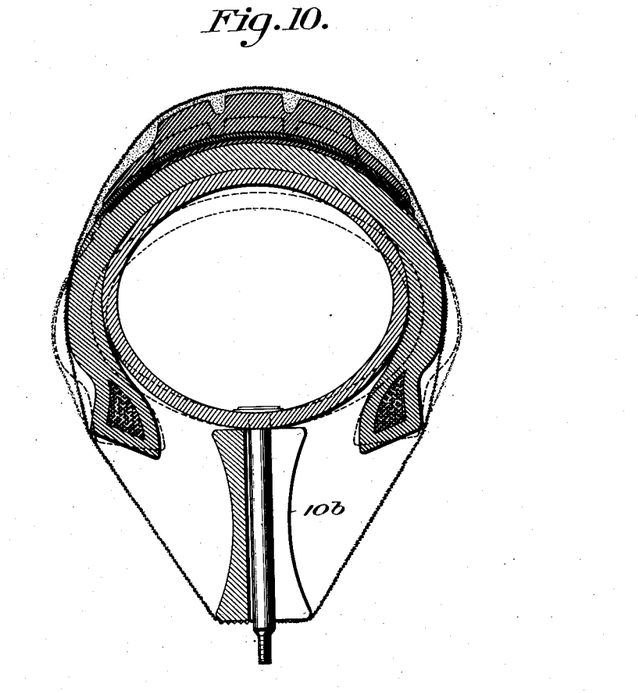
Fig. 10 is a transverse sectional view illustrating another form of the invention.
Figure 11:
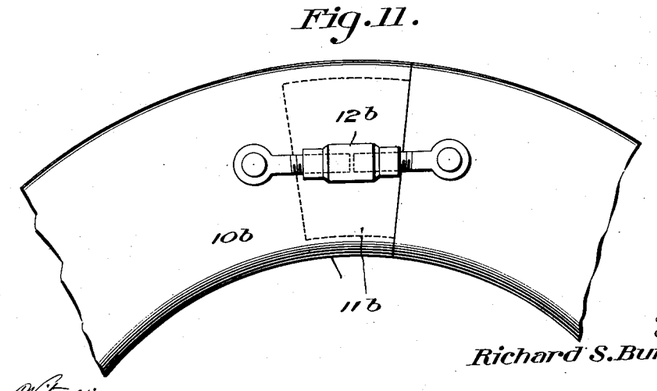
Fig. 11 is a fragmentary side elevational view of one of the elements of the apparatus shown in Fig. 10.

I may elect to eliminate the previously described types of device for tensioning the wrapper and utilize the apparatus shown in Figs. 10 and 11, wherein the flexing action of the elliptic air bag is relied upon to produce the necessary tension upon the wrapper. As shown in Fig. 11, the support 10$^b$ is constructed of sections provided with telescopic end portions 11$^b$, the sections being relatively adjustable by means of the turn buckle arrangement 12$^b$ to increase or diminish the circumference of the support for different sizes of air bags. Other means may be provided for adjusting the sections, but the arrangement shown is believed to be sufficiently illustrative of this feature of the invention.

Figures 12, 13, 14:
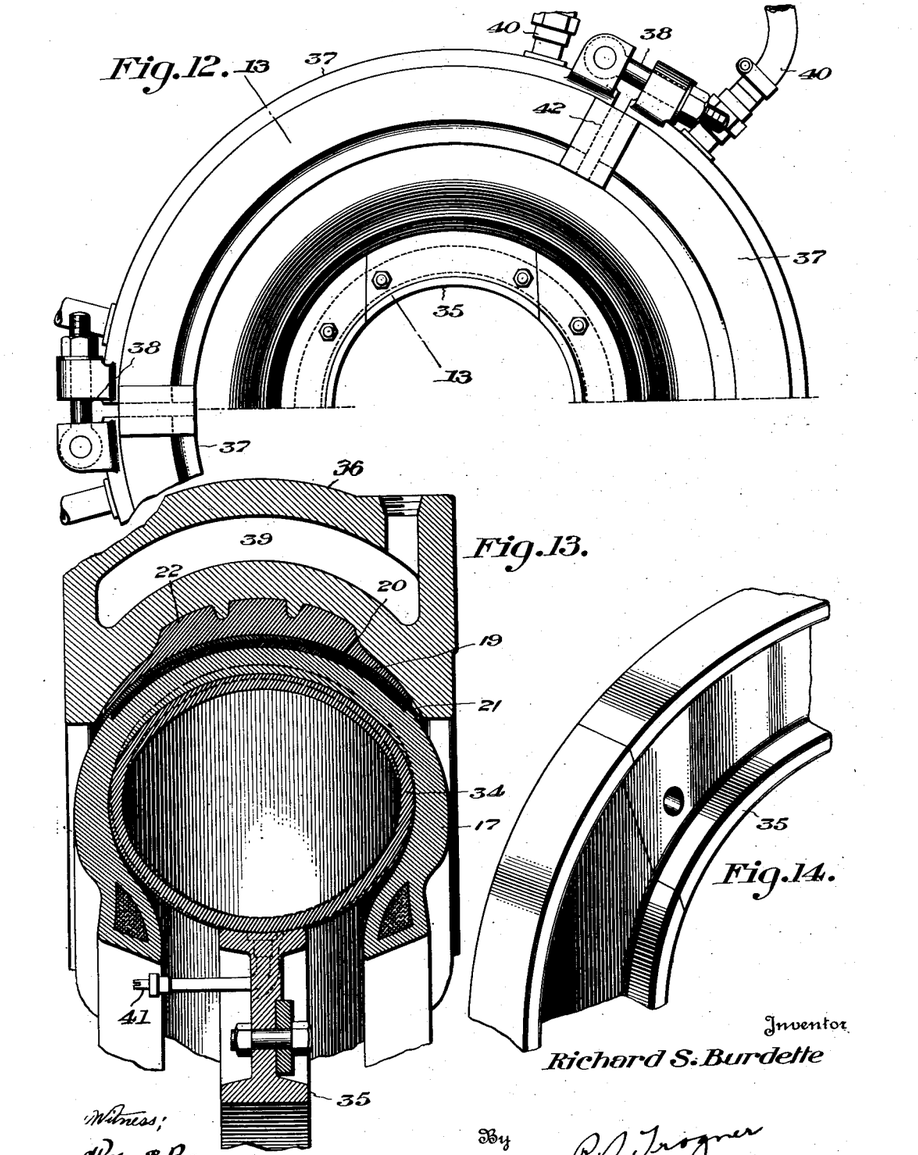
Fig. 12 is a side elevational view illustrating a still further modification of my invention.
Fig. 13 is a transverse sectional view, on an enlarged scale, taken on the line 13—13 of Fig. 12.
Fig. 14 is a perspective view of a portion of one of the elements of the apparatus illustrated in Fig. 12.

In Figs. 12, 13 and 14, I have illustrated in combination with an elliptic air bag 34 the use of a different type of means for compressing the crown of the casing and the tread elements. The supporting annulus 35 is substantially the same as that previously described and illustrated in Figs. 7 and 8, although it may be made expansible as in Fig. 11. The compressing means in this instance comprises a mold 36, which, as shown, is formed of sections 37 adapted to be drawn together with their ends in juxtaposed relation by means of nut and bolt devices 38. Each section is chambered, as indicated at 39, and suitable connections 40 are provided for the admission of steam or hot water into the respective mold chambers. Preferably, I provide mold sections of approximately the width of the tread band, or in other words, of such width as to leave the side walls of the casing exposed. The mold sections are constructed of such circumferential dimensions that, when they are assembled, they may be drawn together to form a full circle mold, the circumference of which is shorter than that of the tread of the casing. With such a mold construction the tread area of the casing and the tread elements are compressed as the mold sections are drawn together, and the side walls of the casing are flexed outwardly. The normal position of the air bag is indicated in dotted lines in Fig. 13 of the drawings, the full line showing indicating the position of the several elements when the mold sections have been drawn together.

When the casing has been compressed to substantially the full line position of Fig. 13, fluid under pressure is admitted through the valve stem 41 into the air bag 34, thus flexing the bag in the direction of the mold sections, and compressing the tread portion of the casing thereagainst. Steam or hot water is next admitted into the mold sections, and the tread elements are thus vulcanized to the casing. Molds of this character may be adjusted in accordance with the variations in size of casings, and may be made with as many sections as desired. Also shims or filler plates, such as are shown at 42, may be utilized to join the ends of the mold sections to prevent the formation of ridges in the tread, in the event that the mold in the drawn together position of its sections is too small for the size of casing being retreaded.

It will be noted that in this form of the invention, as in the previous forms, stretching of the casing and its associated elements, as well as the air bag, is obviated, and that the compression of the elements to be united is secured entirely through a flexing action that does not distend the casing beyond its normal cross-sectional and circumferential dimensions.

Although I have shown a preferred form with certain logical modifications of my invention and utilized specific language in describing the practice thereof, it is to be understood that such disclosure is merely illustrative, and is not to be considered in any way restrictive of the scope and spirit of the invention unless otherwise indicated in the claims appended hereto.

What I claim is:

1. An apparatus for use in applying vulcanizable covering portions to tire casings comprising in combination, a flexible annular core for the casing adapted to contain fluid under pressure, means adapted to engage the inner periphery of the core to support said core and casing, and means adapted to be arranged in encircling relation to the tread zone of the casing and operable to compress said tread zone, the supporting means and tread encircling means being so arranged as to permit relatively free lateral flexing of the side walls of the casing.

2. An apparatus for use in applying vulcanizable covering portions to tire casings comprising in combination, a flexible annular core for the casing adapted to contain fluid under pressure, an annular sectional support for the core and casing, and means adapted to be arranged in encircling relation to the tread zone of the casing and operable to compress said tread zone, the support and tread encircling means being so arranged as to permit relatively free lateral flexing of the side walls of the casing.

3. An apparatus for use in applying vulcanizable covering portions to tire casings comprising in combination, a flexible annular core for the casing adapted to contain fluid under pressure, means adapted to engage the inner periphery of the core to support said core and casing, means adapted to be arranged in encircling relation to the tread zone of the casing and operable to compress said tread zone, and means for effecting such operation of said last means, the supporting means and tread encircling means being so arranged as to permit relatively free flexing of the side walls of the casing.

4. An apparatus for use in applying vulcanizable covering portions to tire casings comprising in combination, a flexible annular core for the casing adapted to contain fluid under pressure, means for supporting the core and casing, means adapted to encircle the tread zone of the casing, said last means being operable to shorten its circumference, and means operable to effect the aforesaid operation of said last means, the supporting means and tread encircling means being so arranged as to permit relatively free movement of the side walls of the casing.

5. An apparatus for use in applying vulcanizable covering portions to tire casings comprising in combination, a flexible core for the casing adapted to contain fluid under pressure, a support for the core and casing, an annular element adapted to encircle the tread zone of the casing, and means for adjusting said element to depress the tread zone of the casing in a direction substantially radially of said casing, the support and annular element being so arranged as to permit relatively free lateral flexing of the side walls of the casing.

6. An apparatus for use in applying vulcanizable covering portions to tire casings comprising in combination, an annular support, a flexible annular core for the casing mounted upon the support, a flexible annular sheath adapted to be arranged in enveloping relation with respect to the casing and support, and means operable to tension the sheath against the tread zone of the casing.

7. An apparatus for use in applying vulcanizable covering portions to tire casings comprising in combination, an annular support, an expansible annular core for the casing adapted to be mounted upon the support, a flexible annular sheath adapted to be arranged in enveloping relation with respect to the support and casing, and a plurality of elements adapted to be arranged exteriorly of the sheath and operable to tension said sheath against the tread zone of the casing.

8. An apparatus for use in applying vulcanizable covering portions to tire casings comprising in combination, an annular sectional support, an expansible annular core for the casing adapted to be mounted upon the support, a flexible annular sheath adapted to be arranged in enveloping relation with respect to the support and casing, and a plurality of elements adapted to be arranged exteriorly of the sheath and operable to tension said sheath against the tread zone of the casing.

9. An apparatus for use in applying vulcanizable covering portions to tire casings comprising in combination, an annular support, a flexible annular core for the casing adapted to be mounted upon the support and to contain fluid under pressure, a flexible sheath adapted to be arranged in enveloping relation with respect to the support and casing, and a plurality of spaced annular members adapted to be arranged exteriorly of the sheath and concentrically of the support, said members being operable to tension the sheath against the tread zone of the casing.

10. An apparatus for use in applying vulcanizable covering portions to tire casings comprising in combination, an annular support, an annular flexible core for the casing adapted to seat upon the support and to contain fluid under pressure, a flexible annular sheath adapted to be arranged in enveloping relation with respect to the support and casing, a plurality of annular elements adapted to be arranged exteriorly of the sheath and concentrically of the support, and means for drawing the members together against the sheath to thereby tension said sheath against the tread zone of the casing.

11. An apparatus for use in applying vulcanizable covering portions to tire casings comprising in combination, an annular sectional support, an annular flexible core for the casing adapted to be seated upon the support and to contain fluid under pressure, an annular flexible sheath adapted to be arranged in enveloping relation with respect to said support and casing, a plurality of annular members adapted to be arranged in spaced relation exteriorly of the sheath and concentrically of the support, and means for moving the members toward each other to tension the wrapper.

12. An apparatus for use in applying vulcanizable covering portions to tire casings comprising in combination, an annular flexible core for the casing, a support for the core and casing comprising annular sections adapted to be arranged in axial alignment and in engaging relation, said sections being provided respectively with an inwardly extending radial flange, means for drawing the sections together in engaging relation, a flexible annular sheath adapted to be arranged in enveloping relation with respect to the support and casing, a plurality of annular members adapted to be arranged in spaced relation exteriorly of the sheath, and means for drawing the members together to tension the sheath against the tread zone of the casing.

13. An apparatus for use in applying vulcanizable covering portions to tire casings comprising in combination, an annular support, an annular flexible core for the casing adapted to be mounted upon the support, said core being normally of elliptical form in cross-section and constructed to contain fluid under pressure, and means adapted to encircle the tread zone of the casing said means being operable to compress said tread zone against the core, the support and tread encircling means being so arranged as to permit relatively free lateral flexing of the side walls of the casing during pressure of the tread zone against the core.

14. An apparatus for use in applying vulcanizable covering portions to tire casings comprising in combination, an annular sectional support, an annular flexible core for the casing adapted to be mounted upon the support and constructed to contain fluid under pressure, and means adapted to encircle the tread zone of the casing, said means being operable to compress said tread zone against the core, the support and tread encircling means being so arranged as to permit relatively free flexing movement of the side walls of the casing during pressure of the tread zone against the core.

15. A method of retreading tire casings that comprises, yieldably supporting the tread portion of the casing against depression, positioning the tread elements upon the casing, applying pressure externally of the tread elements to depress said elements and tread portion so as to permit relatively free movement of the side walls of the casing, yieldably restraining said elements and tread portion against return to normal, forcing the tread portion and elements outwardly toward their normal position, and vulcanizing the elements to the casing.

16. A method of retreading tire casings that comprises, yieldably supporting the tread portion of the casing against depression, positioning the tread elements upon the casing, applying pressure externally of the tread elements to depress said elements and tread portion so as to permit relatively free lateral flexing of the side walls of the casing binding the elements and tread portion to yieldably restrain them against return to normal position, forcing the tread elements and tread portion back into normal position against said binding influence, and vulcanizing the elements to the casing.

17. A method of retreading tire casings that comprises, yieldably supporting the tread portion of the casing against depression, positioning the tread elements upon the casing, binding the tread elements to the casing and simultaneously depressing the elements so as to permit relatively free flexing of the side walls of the casing and tread portion to yieldably restrain them against return to normal position, forcing the tread portion and elements back to normal against said restraining influence, and vulcanizing the tread elements to the casing.

18. An apparatus for use in applying vulcanizable covering portions to tire casings comprising in combination, a resilient arcuate core for the casing adapted to contain fluid under pressure, means engaging the said core to support the same, a flexible covering adapted to encircle the tire casing and the core, and means for flexing said covering, the supporting means and flexible covering being so arranged as to permit relatively free lateral flexing of the side walls of the casing.

19. An apparatus for use in applying vulcanizable covering portions to tire casings comprising in combination, a resilient arcuate core for the casing adapted to contain fluid under pressure, means engaging the core to support the same, a flexible means wound transversely around said tire casing, core and core supporting means, and means for causing said flexible means to exert pressure on said tire casing, the supporting means and flexible means being so arranged as to permit relatively free lateral flexing of the side walls of the casing.

In witness whereof, I have hereunto signed my name.

RICHARD S. BURDETTE.